United States Patent
Mock

(10) Patent No.: US 8,466,601 B2
(45) Date of Patent: Jun. 18, 2013

(54) OPERATING METHOD AND DRIVING MEANS OF A PIEZOLINEAR DRIVE

(75) Inventor: Christopher Mock, Waldbronn (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 443 days.

(21) Appl. No.: 12/798,862

(22) Filed: Apr. 13, 2010

(65) Prior Publication Data

US 2010/0264856 A1    Oct. 21, 2010

(30) Foreign Application Priority Data

Apr. 16, 2009  (DE) ............ 10 2009 017 637

(51) Int. Cl.
*H02N 2/06*    (2006.01)
*H02N 2/00*    (2006.01)

(52) U.S. Cl.
CPC ................... *H02N 2/0075* (2013.01)
USPC ........................ 310/317; 310/328

(58) Field of Classification Search
CPC ...... H01L 41/042; H02N 2/0075; H02N 2/008; H02N 2/06; H02N 2/065; H02N 2/14; H02N 2/145
USPC .................................. 310/317, 328
See application file for complete search history.

(56) References Cited

U.S. PATENT DOCUMENTS

| | | | |
|---|---|---|---|
| 5,092,360 A | 3/1992 | Watanabe et al. | 137/487.5 |
| 5,241,235 A | 8/1993 | Culp | 310/328 |
| 5,568,004 A | 10/1996 | Kleindiek | 310/328 |
| 6,066,911 A | 5/2000 | Lindemann et al. | 310/323.02 |
| 6,150,750 A | 11/2000 | Burov et al. | 310/328 |
| 2005/0127786 A1* | 6/2005 | Hendriks et al. | 310/328 |
| 2006/0232162 A1* | 10/2006 | Vogeley | 310/317 |
| 2008/0252173 A1* | 10/2008 | Yoshida et al. | 310/317 |

FOREIGN PATENT DOCUMENTS

| | | |
|---|---|---|
| DE | 4036287 | 5/1991 |
| DE | 19605214 | 8/1996 |
| DE | 69302084 | 9/1996 |
| DE | 19806127 | 8/1999 |
| DE | 10148267 | 1/2003 |
| EP | 0308970 | 3/1989 |
| WO | WO 02/15380 | 2/2002 |

* cited by examiner

*Primary Examiner* — Derek Rosenau
(74) *Attorney, Agent, or Firm* — Gerald T. Bodner

(57) ABSTRACT

Operating method of a piezolinear drive having a group of piezo stack actuators which drive a rotor, in which the actuators constitute a multilayer ceramic arrangement situated on a common substrate, wherein a first stack part within the stack of the multilayer arrangement is formed as a longitudinal actuator, and a second stack part as a shearing actuator, and the latter being at least indirectly in clamping and shearing contact with the rotor, and at least two identical actuators being situated next to each other in order to perform alternate clamping and advancing movements in the step operation for a rough positioning operation in the step mode, wherein the adjacent actuators of the group are controlled to perform alternate clamping and advancing movements, with control signals being derived from a speed-proportional control variable.

14 Claims, 2 Drawing Sheets

OPERATING METHOD AND DRIVING MEANS OF A PIEZOLINEAR DRIVE

Figure 1:
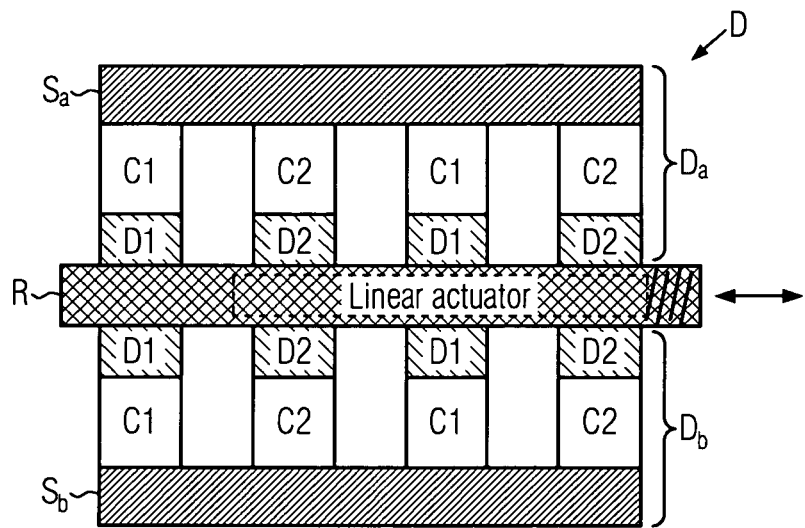

The invention relates to an operating method of a piezolinear drive having a group of piezo stack actuators, wherein adjacent actuators of the group are driven to perform alternating clamping and advancing movements, and an operating control unit for realizing this method.

In recent decades, piezo drives have experienced wide use in the most diverse fields of technology, in particular for micro-positioning or nano-positioning components of optical arrangements or systems of precision mechanics.

The electric energy in piezoelectric drives is converted into motion by making use of the electrostrictive effect of one or more piezoelectric elements. In a piezoelectric drive which makes use of the longitudinal electrostrictive effect, the amount of shift per unit length of the actuator is essentially proportional to the intensity of the field applied. For a high degree of displacement, a high tension needs to be applied between the electrodes, which as a rule lie opposite each other, or the distance between the electrodes must be reduced.

To boost the piezoelectric effect, monolithic multilayer actuators have been developed which consist of a sintered stack of thin films of piezoceramic, e.g. lead zirconate titanate having embedded metallic inner electrodes. The inner electrodes are alternately guided out of the stack and electrically connected via outer electrodes. When electric tension is applied to the outer electrodes, the piezo films will expand in the field direction.

Thanks to the mechanical series connection of the individual piezo films, the nominal extension of the entire piezoceramics is already reached at lower electric tension. Such multilayer actuators are known for example from DE 4 036 287 C2.

From the U.S. Pat. No. 6,150,750 A document, a piezoelectric linear stepper motor is known that comprises actuators constituting a hybrid arrangement situated on a common substrate. Within the cylindrical stack arrangement, a first stack part is formed as a longitudinal actuator, and a second stack part as a shearing actuator. The monolithic ceramics used including an isolation layer require relatively high operating voltages, leading to a reduced total efficiency.

From the U.S. Pat. No. 5,241,235 A document, an actuator stack is already known which is able to perform movements in the stack direction as well as in two directions perpendicular thereto. As to the further prior art concerning piezoelectric or electrostrictive actuators, also for use in stepper drives, reference is made to DE 693 02 084 T2, DE 198 06 127 A1 and DE 196 05 214 A1.

The applicant's DE 101 48 267 B4 describes an improved piezolinear drive comprising a group of piezo stack actuators and an operating method of such a drive. Such a drive is able to realize large actuation paths quickly, and to provide for a highly precise positioning of the object to be positioned with a large holding force near the target point.

Typically, such a piezo drive is controlled based on a position signal as a control signal. Yet it has been shown that this can lead to systematic positioning errors under certain conditions such as in fine positioning a relatively heavy object in a vertical direction or at a vertical motion component. These errors actually may be corrected, but this requires an additional control expenditure and can deteriorate the temporal response behaviour. Moreover, high terminal voltages applied to the longitudinal actuators may cause a deterioration in drive functionality in the case of a position signal-dependent control over extended periods of time.

The invention is therefore based on the task of providing an improved operating method for a piezolinear drive of the above-mentioned kind, and a corresponding operating control unit.

This task is solved in terms of the method by an operating method having the features of claim 1, and in terms of the device, by an operating control unit having the features of claim 6. Appropriate embodiments are the object of the dependent claims.

The inventive solution which provides for the derivation of control signals of the drive from a speed-proportional control variable, allows for reducing high permanent voltage loads and therewith associated degradation occurrences in the actuators to the same extent as losses in the control amplifiers. For certain applications such as the vertical positionings mentioned above, a greater positional precision related to the control expenditure and a better response behaviour may be realized. Incidentally, the method is robust with respect to integration into a position feedback loop.

One embodiment provides for the values of an actuating variable to be derived such that the time dependence of the drive path is approximated to a linear course. Correspondingly, the calculation means in the proposed operating control unit for deriving the values of an actuating variable is configured such that the time dependence of the drive path is approximated to a linear course.

A further preferred embodiment provides for the cycle time of a shearing and clamping tension cycle, and a maximum shear tension for controlling the longitudinal actuators tuned to each other to be derived from the control variable as an actuating variable, and the calculation means of the operating control unit to be configured correspondingly.

In a further embodiment of the inventive method, a maximum cycle time is defined for each step.

A further embodiment of the invention provides for a predetermined value stored in a look-up table in each case to be read-out and used, or a value of the shear tension interpolated from two read-out values to be used for controlling the longitudinal actuators, and the corresponding operating control unit comprises a corresponding look-up table as a specific data memory area. In one embodiment of this configuration, an interpolation unit is provided apart from the look-up table for determining interpolated shear tension values from the predetermined values stored in the look-up table, which in each case apply to the end points of one sampling interval.

Figure 2:
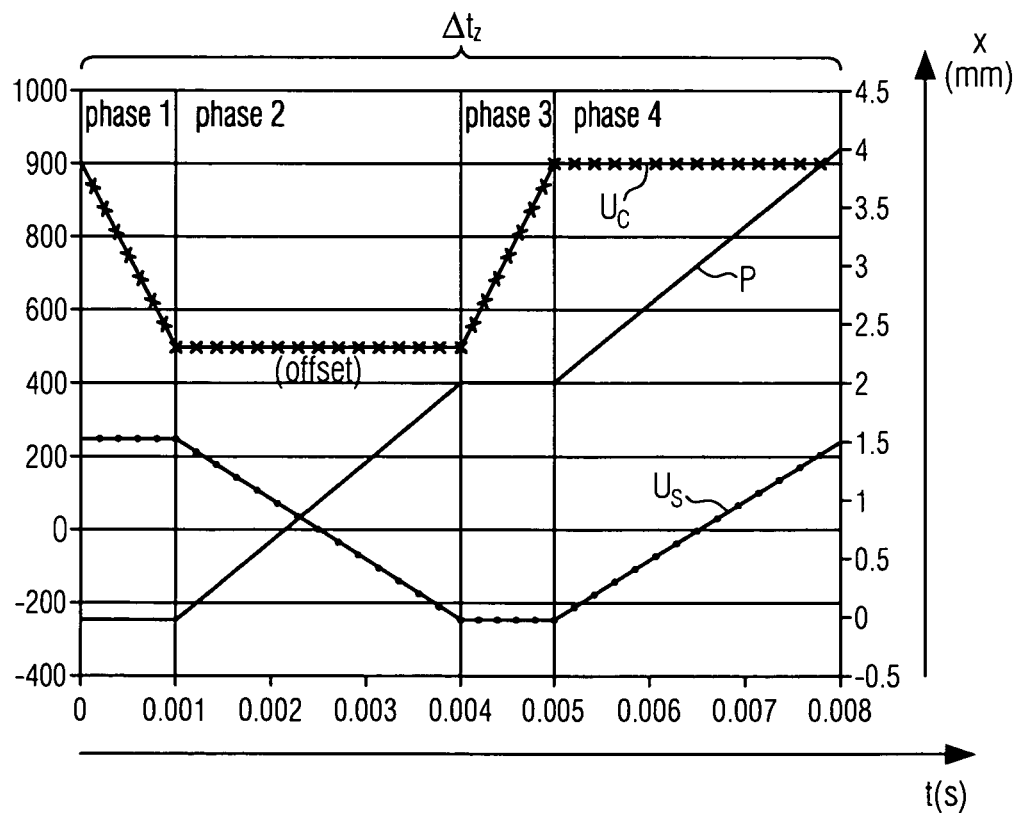

Advantages and functionalities of the invention incidentally become apparent from the following detailed description based on the figures. Shown are:

FIG. 1 a schematic diagram of a piezolinear drive which can be operated by the inventive operating method, FIG. 2 a graphical representation of the control voltage curve and the position curve in one control cycle of the piezolinear drive shown in FIG. 1.

Figure 3:
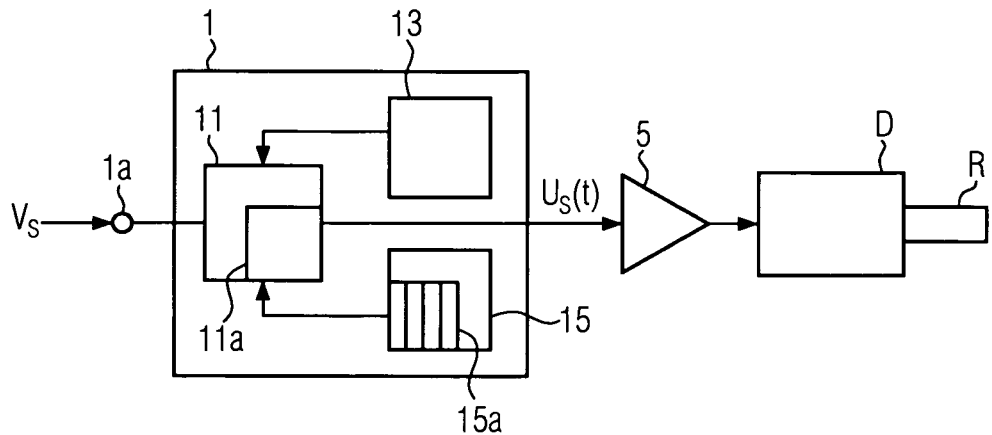

FIG. 3 a schematic drawing of an inventive operating control unit, and

Figure 4:
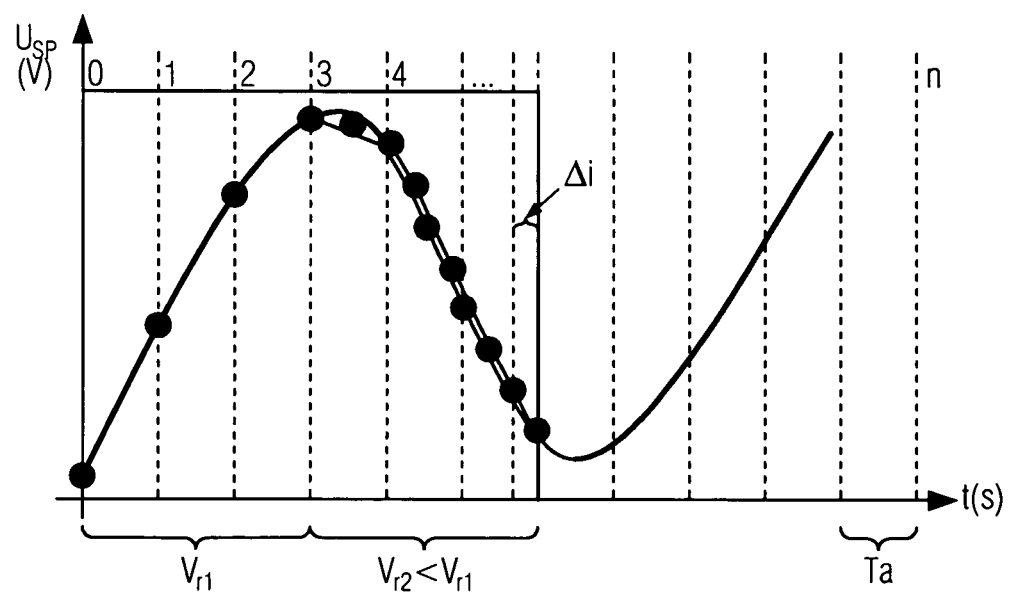

FIG. 4 a graphical representation explaining the operation with interpolated shear tension values.

FIG. 1 schematically shows in a type of longitudinal sectional view a piezolinear drive D which comprises two drive modules Da and Db with a rotor R interlocked therebetween. By a correspondingly synchronized control of the drive modules Da, Db in a step mode, the rotor R is moved in the direction of the double arrow. The first and second drive modules Da, Db each comprise a substrate Sa, respectively Sb, on which a plurality of piezo stack arrangements of shearing or longitudinal actuators D1, D2 and clamping actuators C1, C2 are arranged, with the shearing actuators D1, D2 establishing a clamping contact to the rotor R. It is to be understood that on the surfaces, respectively interfaces of the respective actuators, electrodes are provided for the electric control; these are not separately illustrated in FIG. 1 which is to be understood as a schematic diagram.

Such an arrangement is controlled in the manner described more precisely in the applicant's DE 101 48 267 B4 for alternately performing clamping and advancing movements in the step operation and thereby driving the rotor D in the feed direction during the step mode. The fundamental principle of control is not the subject of the present invention and is therefore not explained here in greater detail.

FIG. 2 illustrates a control diagram of such a piezolinear drive (likewise known per se). The abscissa is the time axis, and the tension U is plotted in volts on a left-hand ordinate, and a position x in millimetres on a right-hand ordinate. The single-line trajectory represents the position as a function of time, the dotted trajectory the temporal course of the shear tension, and the trajectory provided with crosses the temporal course of a terminal voltage, the latter being plotted with an offset of 750 V for the purpose of better clarity. The real terminal voltage mean value is thus zero.

The control of the piezolinear drive in question hence requires the provision of different voltage signals, namely the terminal voltages and shear tensions, based on a control variable (input variable). Usually, this will be a position signal (target position), with a sensor being associated with the drive for detecting the actual position, and the sensor signal being fed back to an input of the associated operating control unit and influencing the provision of the voltage signals (actuating variables) in a predefined manner near the target point. The processing of the position signal may in this case in particular be predefined such that a very rapid or particularly "soft" approximation to the target position can selectively be obtained (without substantial overshooting). Certain drawbacks of this operating control principle have been pointed out above.

In the following, the system constants are considered to be a sampling time Ta defined by the digital basic modules, the maximum voltages Umax of the amplifiers determined by the amplifier construction, the maximum path distance $\Delta x_{s\_max}$ of the actuator determined by the module construction and module bias during a cycle it at the maximum shear tension, and a minimum cycle time $\Delta t_{z\_min}$ and a maximum cycle time $\Delta t_{z\_max}$. While the minimum cycle time is also determined by physical system parameters, in particular of the amplifiers, the maximum cycle time for an implementation is defined by the designer.

The proposed control principle which comprises a determination of the actuating variables based on a speed-dependent control variable or input variable, includes in particular the variation of two variables, and namely of an effective cycle time $\Delta t_z$ and the shear tension amplitude $U_s$.

An essential element of the herein described realization of the invention consists in that a resulting speed of the rotor (drive speed) $v_r$ follows linearly as perfectly as possible a set target speed $v_s$. Incidentally, the following boundary conditions apply to calculating the actuating variables: limiting values for $v_r$ are the maximum path distance per cycle $\Delta x_{s\_max}$ and the minimum cycle time $\Delta t_{z\_min}$. The actual cycle time $\Delta t_z$ has a variation range from $\Delta t_{z\_min}$ to $\Delta t_{z\_max}$. The actual step width $\Delta x_s$ may vary from 0 to $\Delta_{s\_max}$. As a consequence, the actual (resulting) speed may vary between 0 and $\Delta x_{s\_max}/\Delta t_{z\_min}$.

To further explain the calculating of the actuating variables, the dimension-less auxiliary variables f and g are introduced, and firstly applies:

$$\Delta x_s(v_s) = f(v_s) \cdot x_{s\_max} \sim f(v_s) \cdot U_{s\_max} \tag{1}$$

$$66 \; t_z(v_s) = g \cdot t_{z\_min} \tag{2}$$

wherein applies:

$$0 \leq f \leq 1 \tag{1a}$$

$$\frac{t_{z\_max}}{t_{z\_min}} \geq g \geq 1 \tag{2a}$$

The following formulation results upon introduction of a further auxiliary variable, namely a virtual speed v*:

$$vr(v^*) = \frac{\Delta x_{s\_max} \cdot \frac{v^*}{v_{max}}}{\left[1 - \frac{v^*}{v_{max}}\right] - (t_{z\_max} - t_{z\_min}) + t_{z\_min}} \tag{3}$$

$$\Rightarrow v^*(v_r) = \frac{v_r \cdot v_{max} \cdot t_{z\_max}}{v_r \cdot (t_{z\_max} - t_{z\_min}) + \Delta x}. \tag{4}$$

By a comparison of coefficients and introduction of $v_r = v_s$, one may obtain:

$$f = \frac{v^*}{v_{max}} = \frac{v_s \cdot T_{z\_max}}{v_s \cdot (t_{z\_max} - t_{z\_min}) + \Delta x} \tag{5}$$

respectively $$f = \frac{a_v \cdot v_s}{b_v \cdot v_s \cdot c_v} \tag{5a}$$

with:

$$a_v = t_{z\_max} \tag{5b}$$

$$b_v = t_{z\_max} - t_{z\_min} \tag{5c}$$

$$c_v = \Delta x \tag{5d}$$

The thus obtained variable f can be considered and used as a weighting or proportionality factor for the shear tension, whereas the reciprocal 1/g of the auxiliary variable g mentioned above serves as a weighting-proportionality factor for the variation of the cycle time. The highest actual speed is reached for 1/g=1. In movement phases of the drive in which same is driven at this highest speed, an associated value of the shear tension is used for each sampling period according to a predetermined value table. In movement phases in which a lower speed is set, the shear tension value to be supplied to the amplifiers is linearly interpolated from the values stored in the value table; cf. the explanations further below.

FIG. 3 shows a schematic drawing of invention-relevant parts of one embodiment of the proposed operating control unit in the form of a function block diagram. The operating control unit 1 receives the rated speed $v_s$ as a control variable at a control variable input 1a. An output signal of the operating control unit 1 is (in the simplified embodiment depicted here which refrains from the actual presence of several amplifier stages) a time-dependent setting value $U_s(t)$ to be supplied to an amplifier 5. The output signal thereof, namely the shear tension value amplified to the required drive level, is then supplied to the drive D.

The operating control unit 1 comprises a calculation stage 11 which is coupled to a program memory 13 and a data memory 15, and is configured to service the algorithm stored in the program memory 13 using data of the relevant variables stored in the data memory 15. It contains inter alia an interpolation stage 11a, in which predetermined voltage threshold values stored in a look up table 15a within the data memory 15 are processed according to the interpolation algorithm described below. Incidentally, the calculation stage 11 of course processes the values from the look up table 15a as already mentioned above also independent of an interpolation by associating them with specific moments of the operating process (subsequent sampling times).

In one further development of this embodiment, a detection of the actual speed of the rotor of the drive and a feedback of the speed signal to the operating control unit may be provided.

For the interpolation of the shear tension values at low drive speeds, an interpolation interval $\Delta i$ is first needed. For this applies:

$$\Delta i \approx \frac{1}{t_z(v_s)}; \tag{6a}$$

$$\Delta i = \frac{1}{g} \tag{6b}$$

A new comparison of coefficients to equation (3), respectively (4), and $v_r = v_s$, renders:

$$\Delta i = \frac{1}{g} = \frac{t_{z\_min}}{t_{z\_max}} \cdot \frac{(t_{z\_min} - t_{z\_min})}{\Delta x} \cdot vs + \frac{t_{z\_min}}{t_{z\_max}} \tag{7}$$

respectively $\Delta i = a_i \cdot v_s + b_i$ (7a)

with:

$$a_i = \frac{t_{z\_min}}{t_{z\_max}} \cdot \frac{(t_{z\_min} - t_{z\_min})}{\Delta x} \tag{7b}$$

$$b_i = \frac{t_{z\_min}}{t_{z\_max}} \tag{7c}$$

With equation (6b), a relationship to the auxiliary variable g mentioned above is established at the same time.

A realization of the proposed method shows that in a first drive movement phase, distant from the target position, the clamping and shearing frequency as well as the shear tension amplitude are high. Upon approaching the target position, the operating control unit sets a decelerating drive speed, with the drive frequency thereby decreasing just as the terminal voltage does. The reduction of the tension amplitude together with a reduction of the current consumption caused by the reduction of frequency reduces the output power as a whole. The terminal voltage reaches the range near zero as soon as a low speed is regulated for the system.

The inventive operating method allows the shear tension to reach a value of +/−25% of the maximum drive amplitude upon reaching the target position. The consequence of this is that after a so-called relaxation, i.e. the systematic control of all voltages having the objective of all voltages at zero, the position changes only minimally as compared to the previously-reached target position. When thermal changes, the piezodrift and load changes are disregarded, a positioning of a very high precision can thus be maintained without energy.

The variation of the cycle time for a drive has the consequence that several drives cannot be combined with one terminal voltage.

The type of drive allows for multiaxis systems having a P-canonical and V-canonical decoupling.

The realization of the invention is not restricted to the example described above and the aspects pointed out of the described realization but is rather likewise possible in a plurality of modifications lying within the scope of expert procedure.

What is claimed is:

1. An operating method of a piezolinear drive having a group of piezo stack actuators which drive a rotor, in which the actuators constitute a multilayer ceramic arrangement situated on a common substrate, wherein a first stack part within the stack of the multilayer arrangement is formed as a longitudinal actuator, and a second stack part as a shearing actuator, and the latter being at least indirectly in clamping and shearing contact with the rotor, and at least two identical actuators being situated next to each other in order to perform alternate clamping and advancing movements in a step operation for a rough positioning operation in a step mode, wherein the adjacent actuators of the group are controlled to perform alternate clamping and advancing movements, with control signals being derived from a speed-proportional control variable, and wherein a cycle time of a shear voltage cycle and clamping voltage cycle and a maximum shear voltage for controlling the longitudinal actuators and the shearing actuators are tuned to each other and are derived as actuating variables from the control variable.

2. The operating method according to claim 1, wherein values of an actuating variable are derived such that the time dependence of the drive path approximates a linear course.

3. The operating method according to claim 1, wherein a maximum cycle time is preset.

4. The operating method according to claim 1, wherein a predetermined value stored in a look-up table is read out and used, or a value of the shear voltage interpolated from two read-out values is used to control the longitudinal actuators.

5. The operating method according to claim 2, wherein a maximum cycle time is preset.

6. The operating method according to claim 3, wherein a predetermined value stored in a look-up table is read out and used, or a value of the shear voltage interpolated from two read-out values is used to control the longitudinal actuators.

7. An operating control unit of a piezolinear drive having a group of piezo stack actuators which drive a rotor, in which the actuators constitute a multilayer ceramic arrangement situated on a common substrate, wherein a first stack part within the stack of the multilayer arrangement is formed as a longitudinal actuator, and a second stack part as a shearing actuator, and the latter being at least indirectly in clamping and shearing contact with the rotor, and at least two identical actuators being situated next to each other in order to perform alternate clamping and advancing movements in a step operation, wherein calculation means are provided for deriving control signals for the actuators from a speed-proportional control variable, wherein the calculation means derive a cycle time of a shear voltage cycle and clamping voltage cycle, and wherein the cycle time of the shear voltage cycle and clamping voltage cycle and a maximum shear voltage for controlling the longitudinal actuators and the shearing actuators are tuned to each other and are derived as actuating variables from the control variable.

8. The operating control unit according to claim 7, wherein the calculation means for deriving the values of an actuating variable is configured such that the time dependence of the drive path approximates a linear course.

9. The operating control unit according to claim 7, comprising a look-up table for storing predetermined values of the shear voltage for controlling the longitudinal actuators.

10. An operating control unit of a piezolinear drive having a group of piezo stack actuators which drive a rotor, in which the actuators constitute a multilayer ceramic arrangement situated on a common substrate, wherein a first stack part within the stack of the multilayer arrangement is formed as a longitudinal actuator, and a second stack part as a shearing actuator, and the latter being at least indirectly in clamping and shearing contact with the rotor, and at least two identical actuators being situated next to each other in order to perform alternate clamping and advancing movements in a step operation, wherein calculation means are provided for deriving control signals for the actuators from a speed-proportional control variable, and wherein the operating control unit further comprises a look-up table for storing predetermined values of the shear voltage for controlling the longitudinal actuators.

11. The operating control unit according to claim 10, wherein the calculation means has an interpolation unit connected to the look-up table for determining interpolated shear voltage values.

12. An operating control unit of a piezolinear drive having a group of piezo stack actuators which drive a rotor, in which the actuators constitute a multilayer ceramic arrangement situated on a common substrate, wherein a first stack part within the stack of the multilayer arrangement is formed as a longitudinal actuator, and a second stack part as a shearing actuator, and the latter being at least indirectly in clamping and shearing contact with the rotor, and at least two identical actuators being situated next to each other in order to perform alternate clamping and advancing movements in a step operation, wherein calculation means are provided for deriving control signals for the actuators from a speed-proportional control variable, wherein the calculation means for deriving the values of an actuating variable is configured such that the time dependence of the drive path approximates a linear course, and wherein the operating control unit further comprises a look-up table for storing predetermined values of the shear voltage for controlling the longitudinal actuators.

13. The operating control unit according to claim 12, wherein the calculation means has an interpolation unit connected to the look-up table for determining interpolated shear voltage values.

14. The operating control unit according to claim 9, wherein the calculation means has an interpolation unit connected to the look-up table for determining interpolated shear voltage values.

* * * * *